Figure 5:
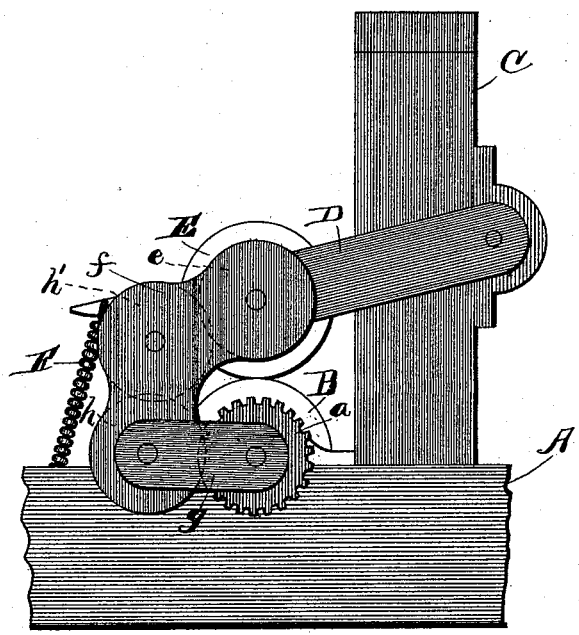

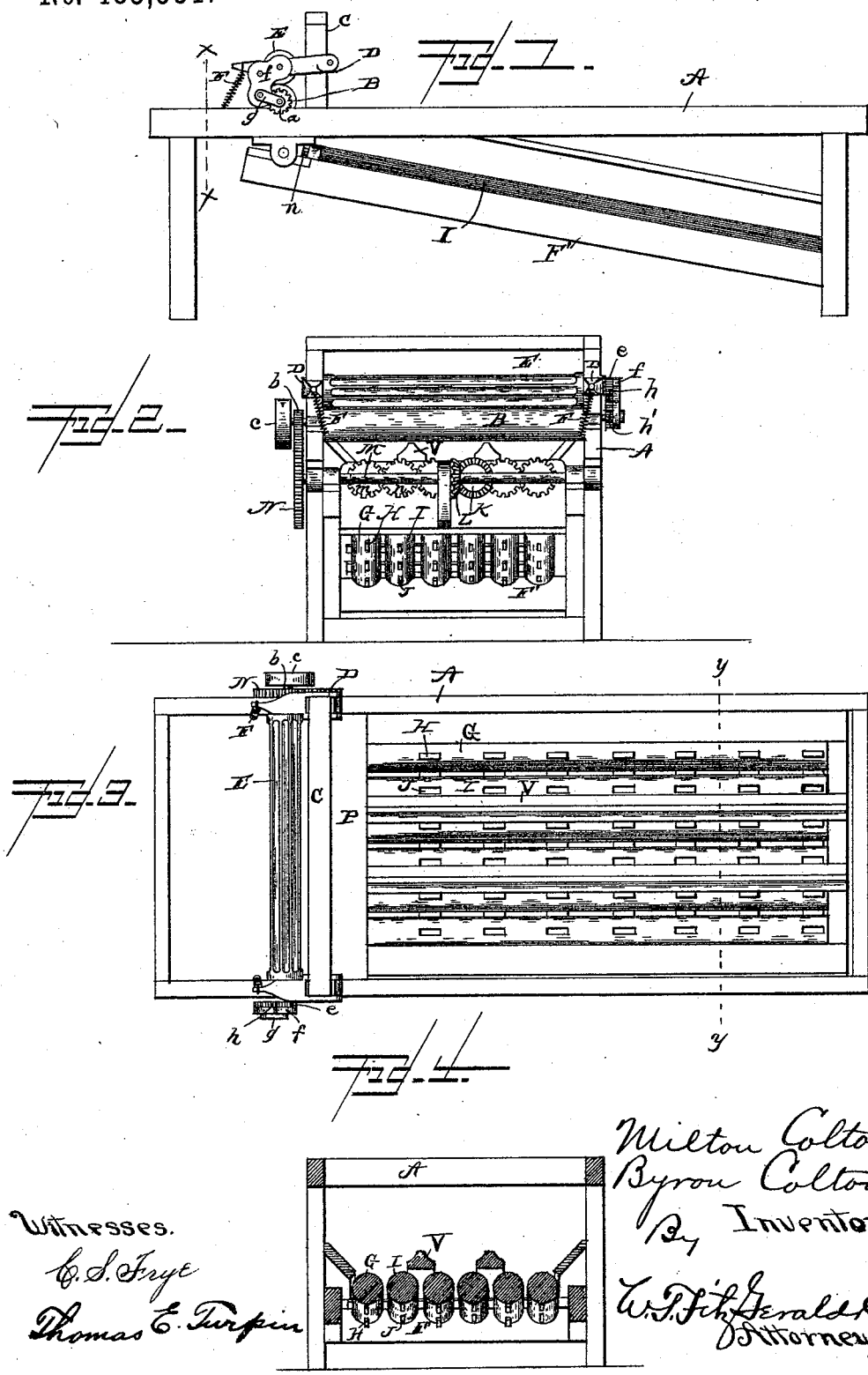

UNITED STATES PATENT OFFICE.

MILTON COLTON AND BYRON COLTON, OF LAMONT, IOWA.

CORN-HUSKING MACHINE.

SPECIFICATION forming part of Letters Patent No. 485,531, dated November 1, 1892.

Application filed April 12, 1892. Serial No. 428,868. (No model.)

*To all whom it may concern:*

Be it known that we, MILTON COLTON and BYRON COLTON, citizens of the United States, residing at Lamont, in the county of Buchanan and State of Iowa, have invented certain new and useful Improvements in Corn-Husking Machines; and we do hereby declare the following to be a full, clear, and exact description of the invention, such as will enable others skilled in the art to which it appertains to make and use the same.

Our invention has relation to improvements in corn-husking machines; and it consists in the peculiar and advantageous construction, certain novel combinations, and the adaptation of parts hereinafter described, and particularly pointed out in the claim appended.

In the accompanying drawings, Figure 1 is a side elevation of our improved husking-machine. Fig. 2 is a transverse section taken in the plane indicated by the line $x\ x$ on Fig. 1, looking toward the rear end of the machine. Fig. 3 is a top plan view, and Fig. 4 is a transverse section, taken in the plane indicated by the line $y\ y$ on Fig. 3. Fig. 5 is an enlarged detailed view of the mechanism embodying my invention.

In the said drawings similar letters designate corresponding parts throughout the several views, referring to which—

A indicates the main frame of our improved machine, which is preferably of a rectangular form, as shown, and is mounted upon suitable legs or other supports.

Journaled in suitable bearings in or upon the main frame A, adjacent to one end thereof, is the plain roller B, which is designed and adapted to serve in conjunction with a corrugated or fluted roller, presently described, to break the husks of the corn preliminary to the removal of the same. This roller B has the ends of its shaft extended to receive the pinions $a\ b$, and upon one of the extended ends of the said roller-shaft is fixed a band-wheel $c$, around which takes a band or belt, which serves to transmit motion to the machine from any approved motor.

Rising from the side bars of the frame A, immediately in rear of the roller B, are standards C, to which are pivotally connected the bifurcated portions of the bearing-boxes D, in which is journaled the shaft of the corrugated or fluted roller E, which is yieldingly held against the roller B by the springs F, connected to the free ends of the boxes D and to the frame A, whereby it will seen that the corrugated roller will give so as to obviate crushing the corn as it is fed between said roller and the roller B.

Fixedly mounted upon one end of the shaft of the roller E is a pinion $e$, and pivotally connected to the same end of the said shaft is a strap $f$, which is connected at its opposite end by a link $g$ to the shaft of the roller B, as better illustrated in Fig. 1 of the drawings. This strap $f$ carries two meshing gear-wheels $h\ h'$, which respectively mesh with the pinion $a$ and the pinion $e$, whereby it will be perceived that the roller E will be rotated regardless of its position.

Suitably connected to the main frame A, adjacent to the forward end thereof, is the forward end of an auxiliary frame F', which is preferably of a rectangular form, as shown, and extends rearwardly and downwardly and preferably has its rear end connected to the rear supports of the main frame, as shown. Journaled in the ends of the frame F', at about the proportional distance illustrated apart, are the shafts of the rollers G, upon the forward ends of which are fixed pinions $m$, which are designed for a purpose presently described. These rollers G, which are preferably of about the proportional diameter illustrated, are provided at suitable intervals in their periphery with radially-disposed knives H, which are designed and adapted to tear the husks from the ears of corn, as will be presently described. Arranged alternately with respect to the rollers G are rollers I, which have their shafts journaled in the end bars of the frame F' and provided with pinions $n$, which mesh with the pinions $m$, whereby it will be seen that the rollers G and I will be rotated in opposite directions. The said rollers I are provided in their peripheries at proper points with respect to the knives H of the rollers G with recesses J, which are designed and adapted to seat the said knives and prevent the same from damaging the ears of corn during the husking process. Fixed upon the end of the shaft of one of the rollers I is a beveled pinion K, with which meshes a beveled pinion L, carried by the transversely-disposed shaft M. This shaft M, which is journaled in suitable bearings, as shown, carries a gear-wheel N at one end, which meshes with the pinion $b$ upon the shaft of the roller B, whereby it will be perceived that the rollers B, E, G, and I will be rotated at a corresponding speed, and choking of the machine will thereby be prevented.

Suitably connected to the end bars of the frame F', above the rollers G I, are two parallel guard-bars V, which are preferably of a triangular form in cross-section, as shown, and are designed and adapted to guide the corn, so as to facilitate the husking thereof. Intermediate the roller B and the rollers G I is arranged an oblique chute P, which serves to guide the corn from the rollers B E to the rollers G I.

In operation the corn is fed between the rollers B E, which serve to break the husks, and is then conducted to the inclined rollers G I, through the medium of which the husks are removed from the ears.

Although we have specifically described the construction and relative arrangement of the several elements of our improved machine, yet we do not desire to be confined to the same, as such changes or modifications may be made as fairly fall within the scope of our invention.

Having thus described our invention, what we claim, and desire to secure by Letters Patent, is—

In a corn-husking machine, the combination, with the frame A, of the roller B, journaled therein, the pinion $b$, mounted on a journal of said roller, the band-wheel $c$, mounted upon one of the said journals, the standards C, rising from the frame A, the bifurcated bearing-boxes D, pivoted to said standard, and the fluted roller E, journaled in said boxes, and the springs F, whereby the fluted roller will be held with a yielding pressure against the roller B to prevent crushing the corn as it is fed between the rollers, substantially as specified.

In testimony whereof we affix our signatures in presence of two witnesses.

MILTON COLTON.
BYRON COLTON.

Witnesses:
A. K. ANDERSON,
ALDEN WHITNEY.